US007195213B2

(12) United States Patent
Weatherly

(10) Patent No.: US 7,195,213 B2
(45) Date of Patent: Mar. 27, 2007

(54) ADJUSTABLE TELEVISION STAND

(75) Inventor: Matthew Weatherly, Belton, MO (US)

(73) Assignee: O'Sullivan Industries Inc., Lamar, MO (US)

( * ) Notice: Subject to any disclaimer, the term of this patent is extended or adjusted under 35 U.S.C. 154(b) by 27 days.

(21) Appl. No.: 10/752,908

(22) Filed: Jan. 7, 2004

(65) Prior Publication Data

US 2004/0188573 A1    Sep. 30, 2004

Related U.S. Application Data

(60) Provisional application No. 60/458,985, filed on Mar. 31, 2003.

(51) Int. Cl.
*A47F 5/00* (2006.01)
*A47B 97/00* (2006.01)

(52) U.S. Cl. .............. 248/125.1; 248/124.1; 248/451

(58) Field of Classification Search ........... 248/125.1, 248/121, 122.1, 124.1, 125.3, 129, 441.1, 248/451, 469, 176.3; 211/134, 153
See application file for complete search history.

(56) References Cited

U.S. PATENT DOCUMENTS

| | | | | | |
|---|---|---|---|---|---|
| 1,554,137 | A | * | 9/1925 | Slifkin | 108/6 |
| 2,032,872 | A | * | 3/1936 | Friedrichs | 248/449 |
| 2,912,203 | A | * | 11/1959 | Townsend | 248/448 |
| 2,986,366 | A | * | 5/1961 | Wesson | 248/285.1 |
| 3,231,230 | A | * | 1/1966 | Mueller | 248/449 |
| 3,368,786 | A | * | 2/1968 | Orville | 248/455 |
| 3,738,606 | A | * | 6/1973 | Millen | 248/449 |
| 3,759,482 | A | * | 9/1973 | Wright | 248/449 |
| 3,799,488 | A | * | 3/1974 | Sena | 248/452 |
| 3,926,398 | A | * | 12/1975 | Vincent | 248/448 |
| 4,165,856 | A | * | 8/1979 | Wiseheart | 248/449 |
| 4,856,749 | A | * | 8/1989 | Habermann | 248/448 |
| 4,895,381 | A | * | 1/1990 | Farlow | 280/33.997 |
| 5,040,762 | A | * | 8/1991 | Potter | 248/460 |
| 5,129,525 | A | * | 7/1992 | Maynard, Jr. | 211/205 |
| 5,160,104 | A | * | 11/1992 | Sher | 248/176.1 |

(Continued)

FOREIGN PATENT DOCUMENTS

DE    2612636    9/1977

(Continued)

OTHER PUBLICATIONS

The Patent Office Patents Directorate, "Patents Act 1977: Search Report Under Section 17," of Jul. 21, 2004, U.K. Patent Application No. GB0406883.9, filed Mar. 26, 2004, 2 pages.

(Continued)

*Primary Examiner*—Anita M. King
(74) *Attorney, Agent, or Firm*—Haynes and Boone LLP; Dave R. Hofman

(57) ABSTRACT

An adjustable stand is described. The adjustable stand includes a support, at least one upper bracket engaged with and adjustable along the support, at least one lower bracket engaged with and adjustable along the support, an upper clamp member operatively connected to the at least one upper bracket, and a lower clamp member operatively connected to the at least one lower bracket, the upper and lower clamp members being adjustable relative to the corresponding at least one upper and lower brackets and cooperating to hold an apparatus therebetween.

30 Claims, 8 Drawing Sheets

U.S. PATENT DOCUMENTS

| | | | | |
|---|---|---|---|---|
| 5,219,142 | A | * | 6/1993 | Potter .......................... 248/454 |
| D346,058 | S | * | 4/1994 | Samso ......................... D34/21 |
| 5,615,854 | A | | 4/1997 | Nomura et al. |
| 5,683,066 | A | * | 11/1997 | McCann ................ 248/295.11 |
| 5,732,912 | A | | 3/1998 | Nomura et al. |
| 5,791,623 | A | * | 8/1998 | Louridas ..................... 248/451 |
| 5,899,429 | A | * | 5/1999 | McCloud ................. 248/441.1 |
| 5,944,896 | A | * | 8/1999 | Landesman et al. ........ 118/500 |
| 6,024,348 | A | * | 2/2000 | Ventura et al. ............... 269/17 |
| D474,047 | S | * | 5/2003 | Lara ........................... D6/479 |
| 6,581,887 | B2 | * | 6/2003 | Lapidez .................. 248/122.1 |
| D480,237 | S | * | 10/2003 | de Carolis .................. D6/474 |
| D495,163 | S | * | 8/2004 | Weatherly ................... D6/479 |

FOREIGN PATENT DOCUMENTS

| | | |
|---|---|---|
| DE | 9211455 | 12/1992 |
| FR | 2166619 | 8/1973 |
| FR | 2374868 | 7/1978 |
| GB | 1298916 | 12/1972 |
| GB | 2 045 068 A | 10/1980 |
| GB | 2311717 | 10/1997 |
| WO | WO 2005/004673 | 1/2005 |

OTHER PUBLICATIONS

United Kingdom—The Patent Office, "Patents Act 1977: Search Report under Section 17(6)," GB Application No. GB0406883.9, Jul. 6, 2005, 2 pages.

* cited by examiner

ADJUSTABLE TELEVISION STAND

CROSS-REFERENCE TO RELATED APPLICATIONS

This application claims the benefit of U.S. Provisional Application No. 60/458,985, filed on Mar. 31, 2003.

BACKGROUND

The present disclosure relates generally to adjustable furniture and, more particularly, to a television stand that is adjustable to support televisions of different sizes.

Appliances, such as televisions, are often housed on or within stands or similar furniture assemblies (e.g., entertainment centers). Such assemblies may present a surface on which a television may be placed, or may provide an attachment mechanism that holds the television. As televisions come in a variety of different sizes and shapes, it may be difficult to find a stand or other assembly that will fit a particular television.

Therefore, what is needed is an adjustable television stand that can support televisions of different sizes and shapes.

BRIEF DESCRIPTION OF THE DRAWINGS

FIG. 5a is a detailed perspective view depicting a clamp member and an adjustable bracket associated with the adjustable television stand of FIG. 1.

FIG. 5b is a partial exploded view of the detailed portion of the adjustable television stand depicted in FIG. 5a.

DESCRIPTION

Figure 1:
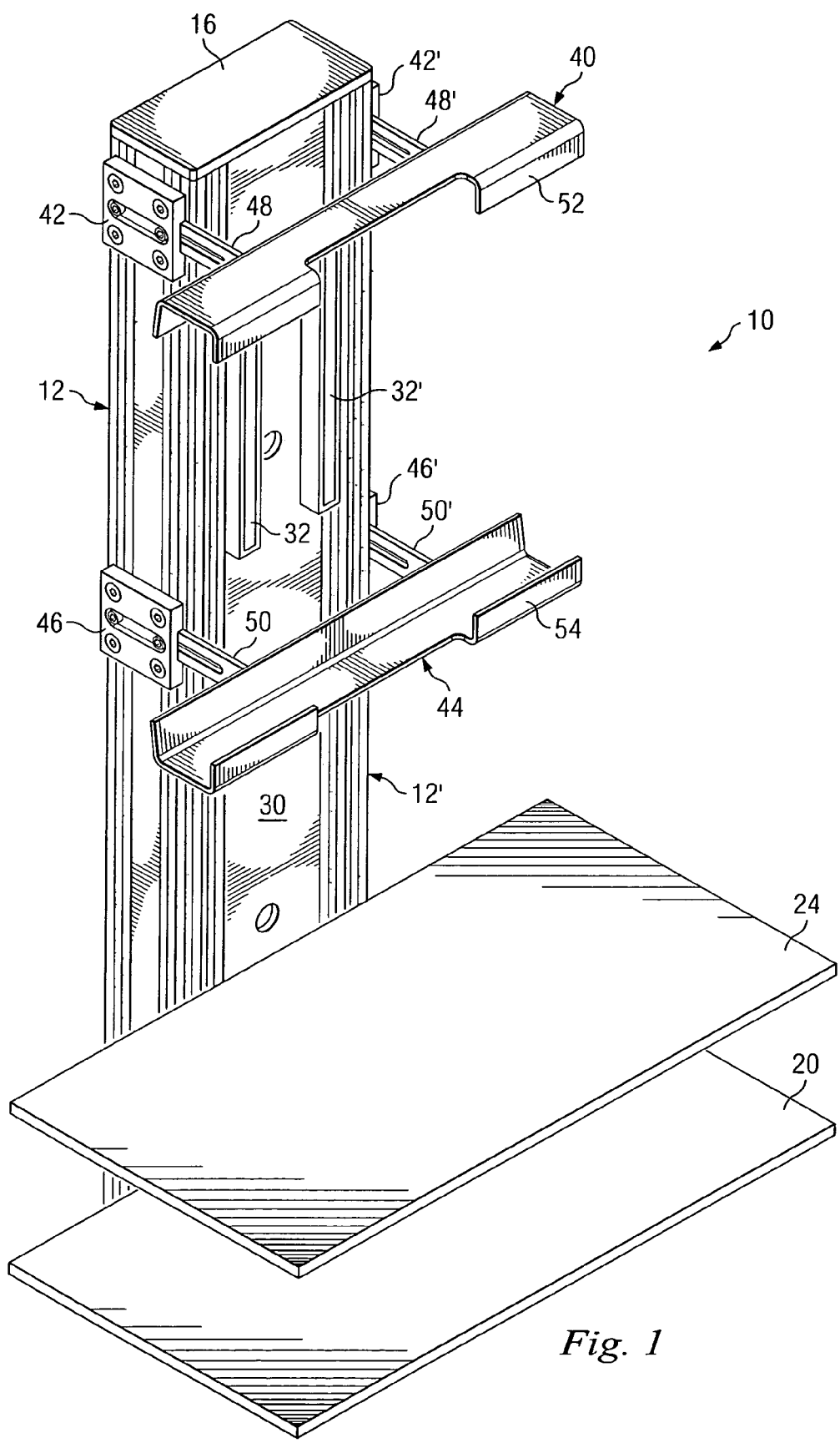
FIG. 1 is a front perspective view of an adjustable television stand according to one embodiment of the present disclosure.
Figure 2:
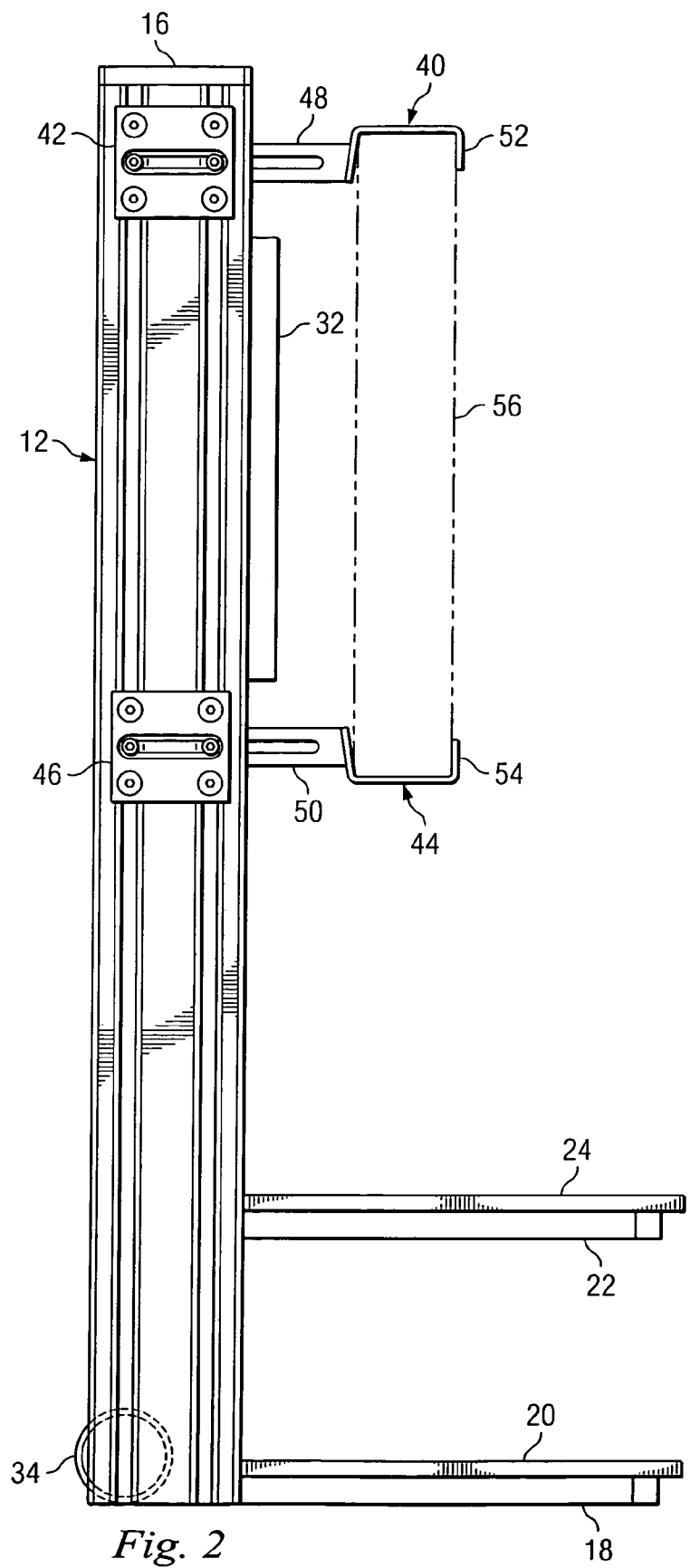
FIG. 2 is a side view of the adjustable television stand of FIG. 1.
Figure 3:
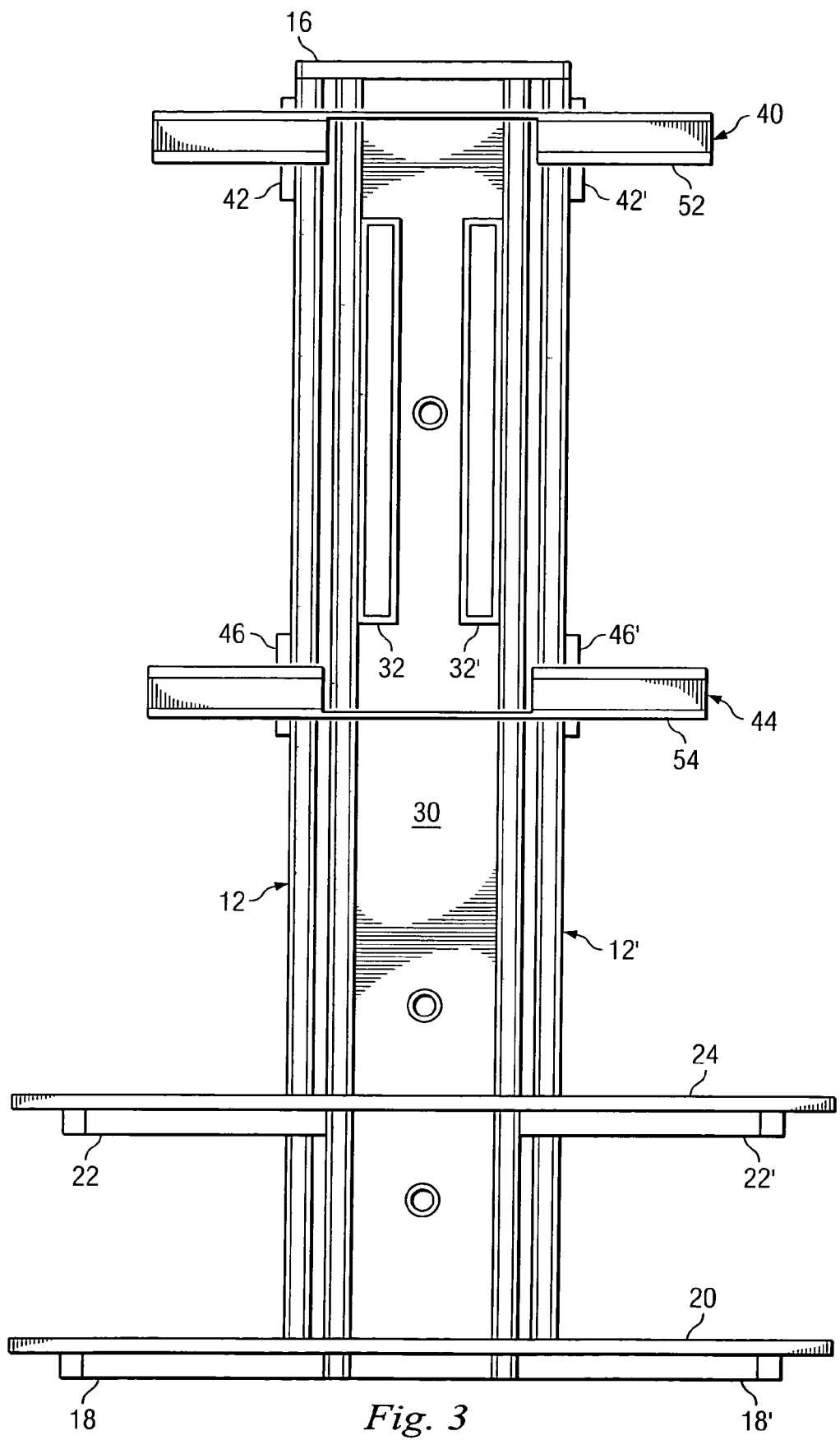
FIG. 3 is a front view of the adjustable television stand of FIG. 1.

The present disclosure relates to adjustable furniture and, more particularly, to a television stand that is adjustable to support televisions of different sizes and shapes. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIGS. 1–4, an adjustable television stand is generally referred to by reference numeral 10. The stand 10 includes a pair of parallel, horizontally spaced, vertical supports 12, 12'. It is understood that substantially identical components are given the same reference numerals in this specification. Although substantially identical components are given the same reference numerals, the components on the right side of the stand 10 in FIGS. 1–3 (on the left side of the stand 10 in FIG. 4) are given an apostrophe ("'") to simplify the following explanation of the stand 10. The upper ends of the vertical supports 12, 12' (as viewed in FIG. 1) are connected via a plate 16, which is secured to the vertical supports in any conventional manner. A pair of horizontally-extending supports 18, 18' (FIG. 3) are connected in any conventional manner to the vertical supports 12, 12', respectively, and extend therefrom to provide the stand 10 with an appreciable degree of stability when resting on a surface. As such, the horizontally-extending supports 18, 18' extend such that they are angled away from each other to provide support for the stand 10. A shelf 20 is disposed transversely across the upper surfaces of the horizontally-extending supports 18, 18' (as viewed in FIG. 1) to provide the stand 10 with a storage area.

Figure 4:
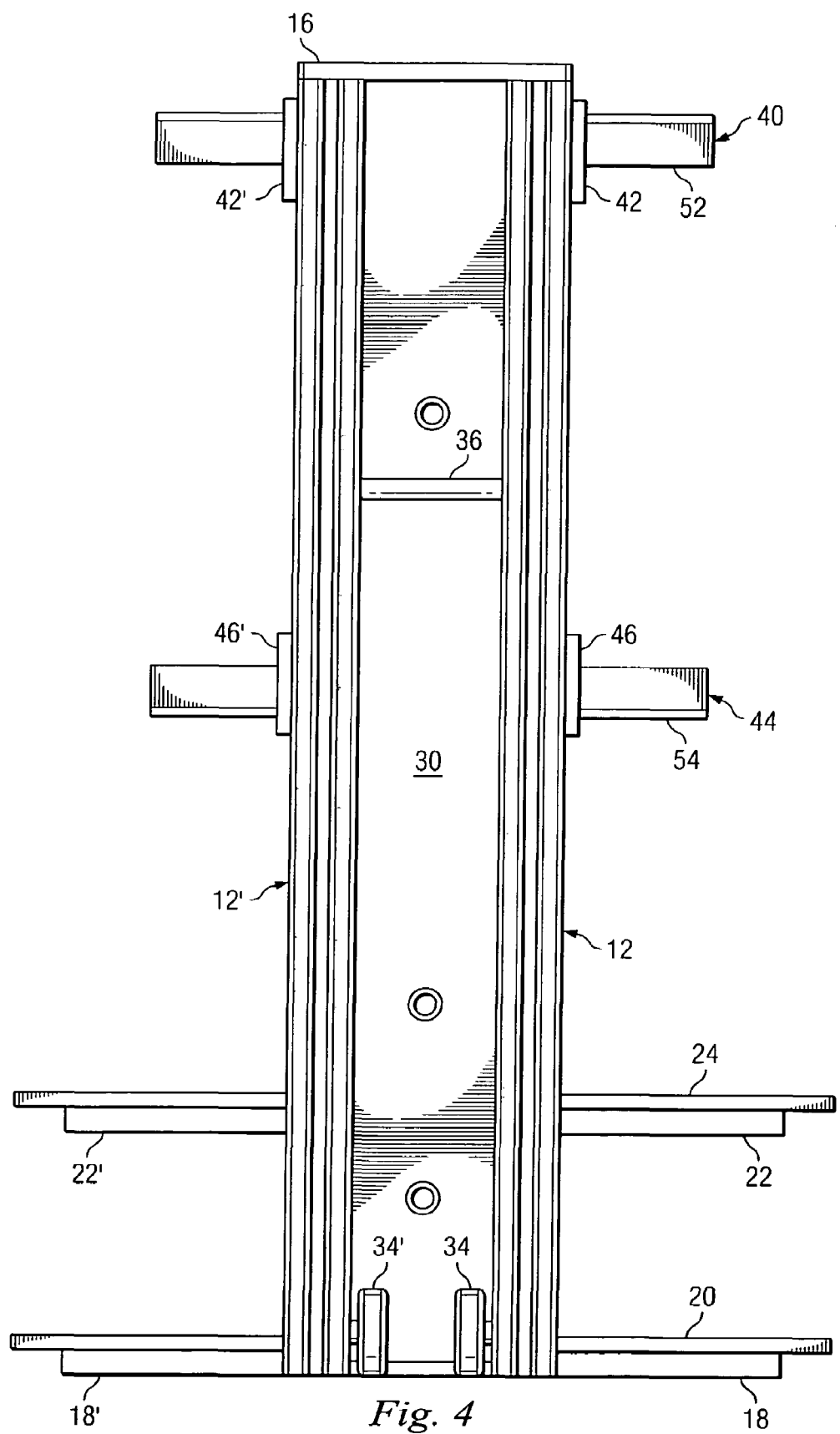
FIG. 4 is a back view of the adjustable television stand of FIG. 1.

A pair of horizontally-extending shelving supports 22, 22' (FIG. 3), vertically-spaced from the supports 18, 18', are connected in any conventional manner to the vertical supports 12, 12', respectively, and extend therefrom to support an additional shelf 24 associated with the stand 10. A panel 30 is connected between the vertical supports 12, 12' in any conventional manner, and includes a pair of stop members 32, 32' disposed thereon for reasons to be described. Referring to FIG. 4, a pair of wheels 34, 34' are operatively connected to the vertical supports 12, 12' proximate to a lower end of the stand 10 (as viewed in FIG. 4), thereby facilitating movement of the stand. A handle 36 (FIG. 4) is further connected between the vertical supports 12, 12' in any conventional manner to further facilitate movement of the stand.

Referring again to FIGS. 1–4, an upper clamp member 40 is adjustably secured to the vertical supports 12, 12' by adjustable brackets 42, 42', respectively, as will be further described. Similarly, a lower clamp member 44 is adjustably secured to the vertical supports 12, 12' by adjustable brackets 46, 46', respectively. The clamp member 40 includes a pair of flange portions 48, 48' (FIGS. 1 and 2) for connecting the clamp member 40 to the adjustable brackets 42, 42', respectively. Similarly, the clamp member 44 includes a pair of flange portions 50, 50' (FIGS. 1 and 2) for connecting the clamp member 44 to the adjustable brackets 46, 46', respectively.

The clamp members 40, 44 each further include a holding portion 52, 54, respectively, integrally formed with the pair of corresponding flange portions 48, 48' and 50, 50'. The clamp members 40, 44 cooperate to hold a television, such as a television having a size and shape similar to that of a plasma screen television (depicted in phantom as 56 in FIG. 2), therebetween.

Figure 5:
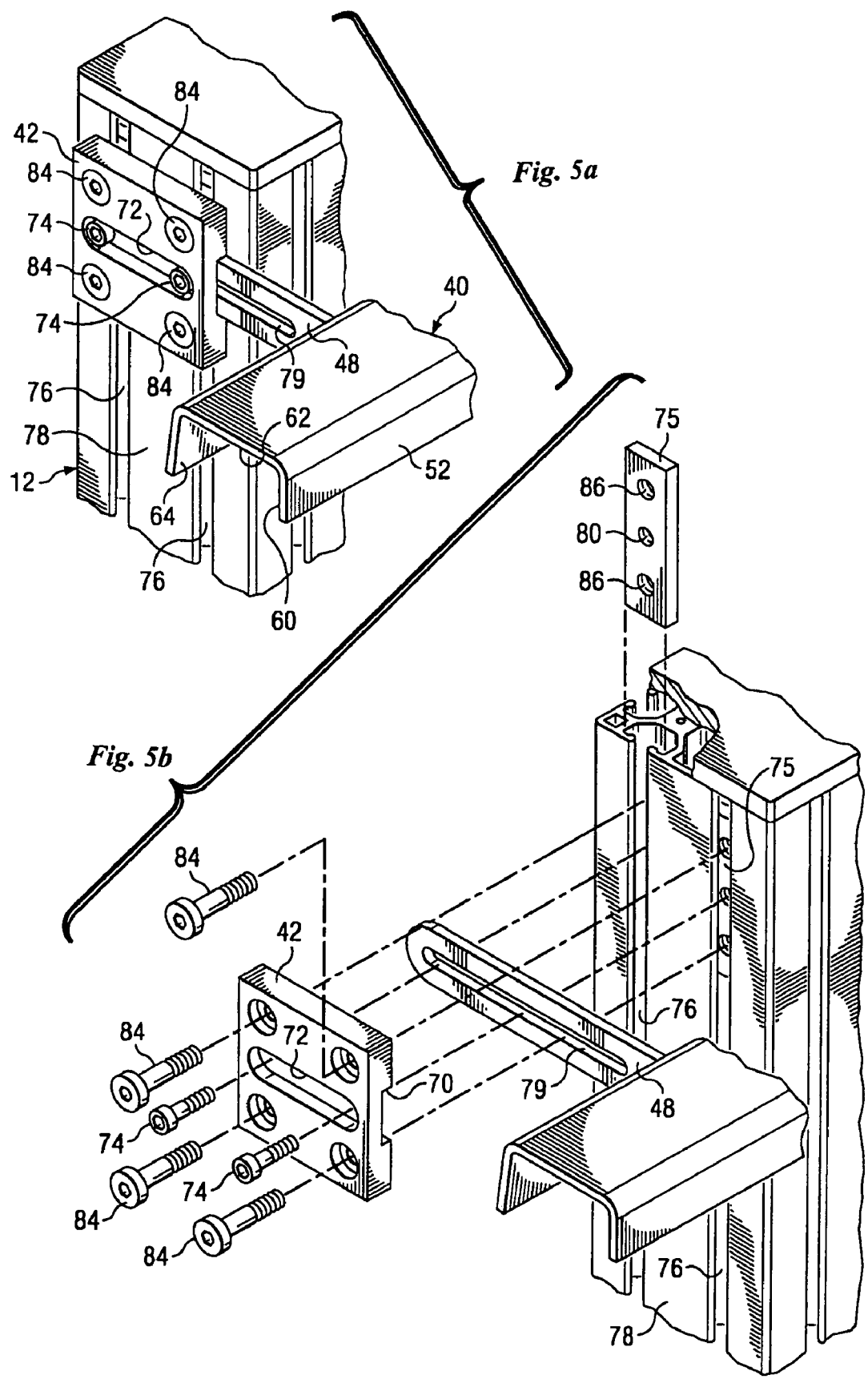

Referring to FIG. 5a, to facilitate holding of a television (not shown), the holding portion 52 includes a flat front restraint 60, an upper restraint 62, and a rear angled restraint 64, which cooperate to provide the holding portion with a cup-like shape. The cup-like shape provided by the restraints 60, 62, 64 accommodates receipt of an edge of a television therein. It is understood that the holding portion 54 is shaped in a similar, yet opposed, manner.

Referring again to FIGS. 1 and 2, the clamp members 40, 44 are adjustable in the horizontal and vertical directions to accommodate televisions of different sizes and shapes. As such, the clamp member 40 is adjustable in the horizontal direction via adjustment of the flange portions 48, 48' within the adjustable brackets 42, 42', respectively, and in a similar manner, the clamp member 44 is adjustable in the horizontal direction via adjustment of the flange portions 50, 50' within the adjustable brackets 46, 46', respectively.

For sake of clarity, only one flange portion 48 and its interaction with the adjustable bracket 42 will be described. Referring to FIGS. 5a and 5b, the flange portion 48 extends into a groove 70 defined in the adjustable bracket 42. An elongated slot 72 is formed in the adjustable bracket 42 through which a pair of connectors 74 transversely extend to engage corresponding receiving members 75 disposed in the vertical support 12. In one embodiment, the receiving members 75 are extended nuts, which are disposed in a pair of channels 76 defined in an outer side 78 (relative to the other vertical support 12') of the vertical support 12. More particularly, the connectors 74 are each adapted to additionally extend through a slot 79 defined in the flange portion 48 to thread into corresponding openings 80 defined in the corresponding receiving member 75. The heads of the connectors 74 engage the flange portion 48 when secured to the corresponding receiving members 78, thereby retaining the flange portion, and therefore, the clamp member 40 at a desired horizontal position. Accordingly, the clamp member 40 is horizontally adjustable within the groove 70, and can be adjusted to any number of horizontal positions by loosening the connectors 74 and moving the flange portion 48. It is understood that the flange portions 48', 50, 50' are horizontally adjustable in a substantially similar manner.

Moreover, the clamp members 40, 44 are adjustable in the vertical direction via adjustment of the adjustable brackets 42, 42' and 46, 46', respectively, along the vertical supports 12, 12', respectively. It is understood that the clamp members 40, 44 and their associated adjustable brackets 42, 42' and 46, 46' may each be referred to as a clamp assembly. For sake of clarity, only one adjustable bracket 42 and its interaction with the vertical support 12 will be described. A plurality of connectors 84 are adapted to extend transversely through the adjustable bracket 42 to thread into corresponding openings 86 defined in the receiving members 75. The engagement of the connectors 84 into the openings 86 provides a compressive force sufficient to lock the adjustable bracket and receiving member to the vertical support 12 at a desired position. As can be appreciated, should another position of the adjustable bracket 42 be desired, the connectors 74, 84 may be loosened from the receiving members 75, and the adjustable bracket and receiving members can be vertically adjusted to another position, whereupon the connectors 74, 84 are reengaged with the receiving members 75, and the vertical support 12. The channels 76 extend along a substantial portion of the outer side 78 of the vertical support 12, which allows for an appreciable degree of vertical adjustment of the receiving members 75, and therefore, the adjustable bracket 42. Referring again to FIG. 1, it is understood that the adjustable brackets 46 and 42', 46' are vertically adjustable along the vertical supports 12, 12' in a substantially similar manner.

In operation, and with reference to FIGS. 1–5b, the stand 10 is assembled to hold the television 56 between the clamp members 40, 44. The stand 10 can be altered to accommodate relatively smaller televisions by loosening the connectors 74, 84 associated with the adjustable brackets 42, 46 and 42', 46', adjusting the clamp members 40, 44 vertically towards one another, and reengaging the adjustable brackets with the vertical supports 12, 12', respectively. Alternatively, the stand 10 can be altered to accommodate relatively larger televisions by loosening the connectors 74, 84 associated with the adjustable brackets 42, 46 and 42', 46', adjusting the clamp members 40, 46 vertically away from one another, and reengaging the adjustable brackets with the vertical supports 12, 12', respectively.

Moreover, if desired, the television 56 is then moved back (e.g., towards the vertical supports 12, 12' as viewed in FIG. 1) until it contacts the stop members 32, 32', which are provided as an abutment surface for the television to abut against the stand 10. This is accomplished by loosening the connectors 74 and moving the flange portions 48, 48' and 50, 50' of the clamp members 40, 44, respectively, within the grooves 70 of the corresponding adjustable brackets 42, 42', 46, 46'. Once the television 56 contacts the stop members 32, 32', the clamp members 40, 44 are secured in the grooves 70 of the corresponding adjustable brackets 42, 42', 46, 46' by reengaging the connectors 74 with the vertical support 12, which secures the television to the stand 10 and prevents front to back movement (as viewed in FIG. 1).

Movement of the stand 10 is facilitated by the wheels 34, 34' and the handle 36. For example, after the television 56 has been secured to the stand 10, the stand may be tilted rearwards (as viewed in FIG. 1) onto the wheels 34, 34', held at the handle 36, and moved as desired.

Accordingly, televisions of different sizes and shapes may be accommodated by the stand 10 by adjustment of the clamp members 40, 44. For example, the clamp members 40, 44 may accommodate televisions of different heights, different widths, and different depths.

As can be appreciated, the above-described clamp members 40, 44 and adjustable brackets 42, 42' and 46, 46' can be used with alternative adjustable television stands without departing from the spirit and scope of the disclosure. For example, and referring now to FIGS. 6 and 7, an alternative television stand is generally depicted by reference numeral 110. The stand 110 includes a pair of horizontally-spaced, vertical supports 112, 112'. As with FIGS. 1–4, the components on the right side of the stand 110 in FIG. 6 (on the left side of the stand 110 in FIG. 7) are given an apostrophe ("'") to simplify the following explanation of the stand 110. The lower ends of the vertical supports 112, 112' are connected in any conventional manner to one end of a horizontal support member 114. The opposing end of the horizontal support member 114 intersects with a horizontal crosspiece 116 that is perpendicular to the horizontal support member 114, thereby providing an appreciable degree of stability to the stand 110.

Figure 6:
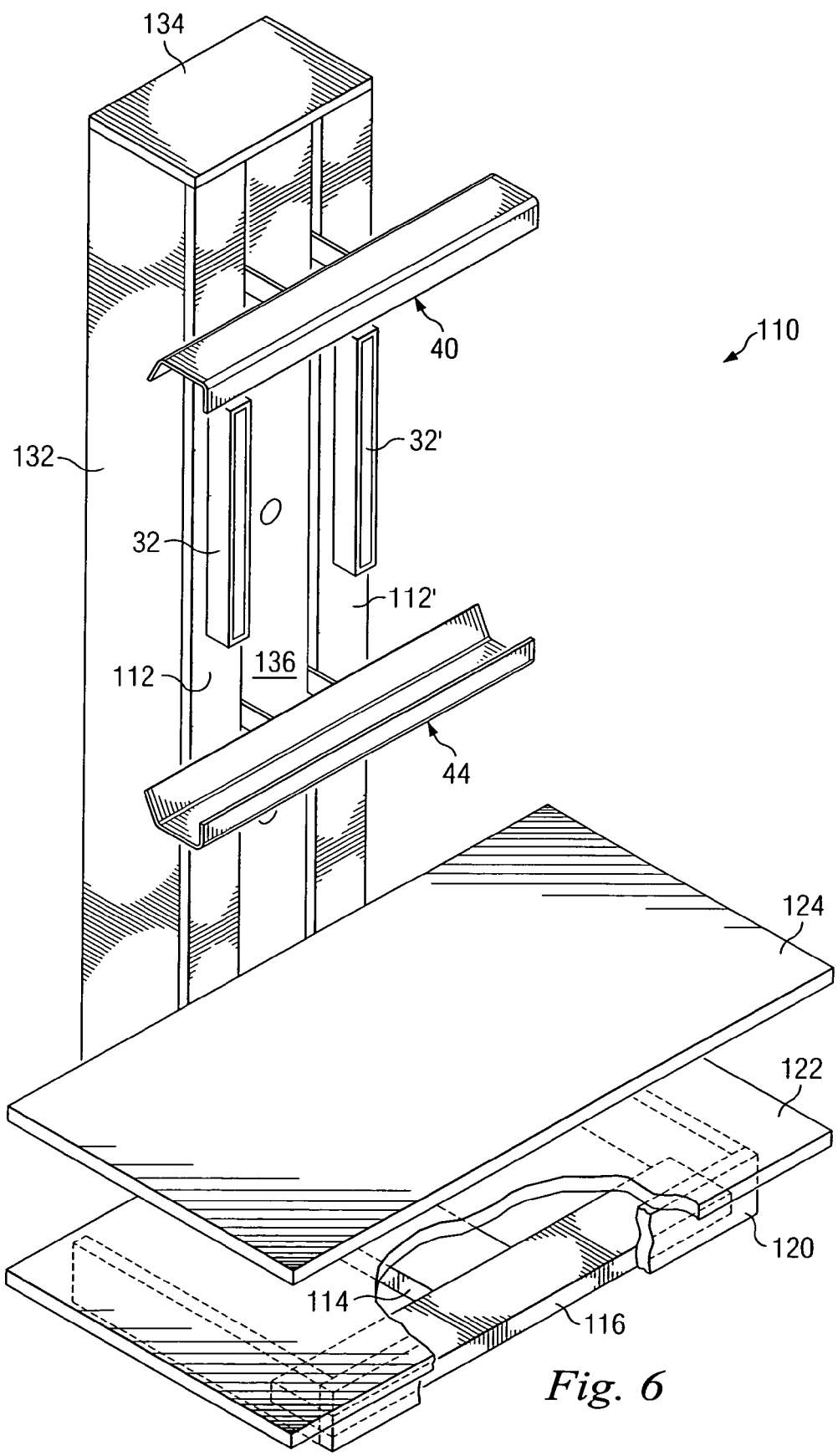
FIG. 6 is a front perspective view of an alternative adjustable television stand according to another embodiment of the present disclosure.
Figure 7:
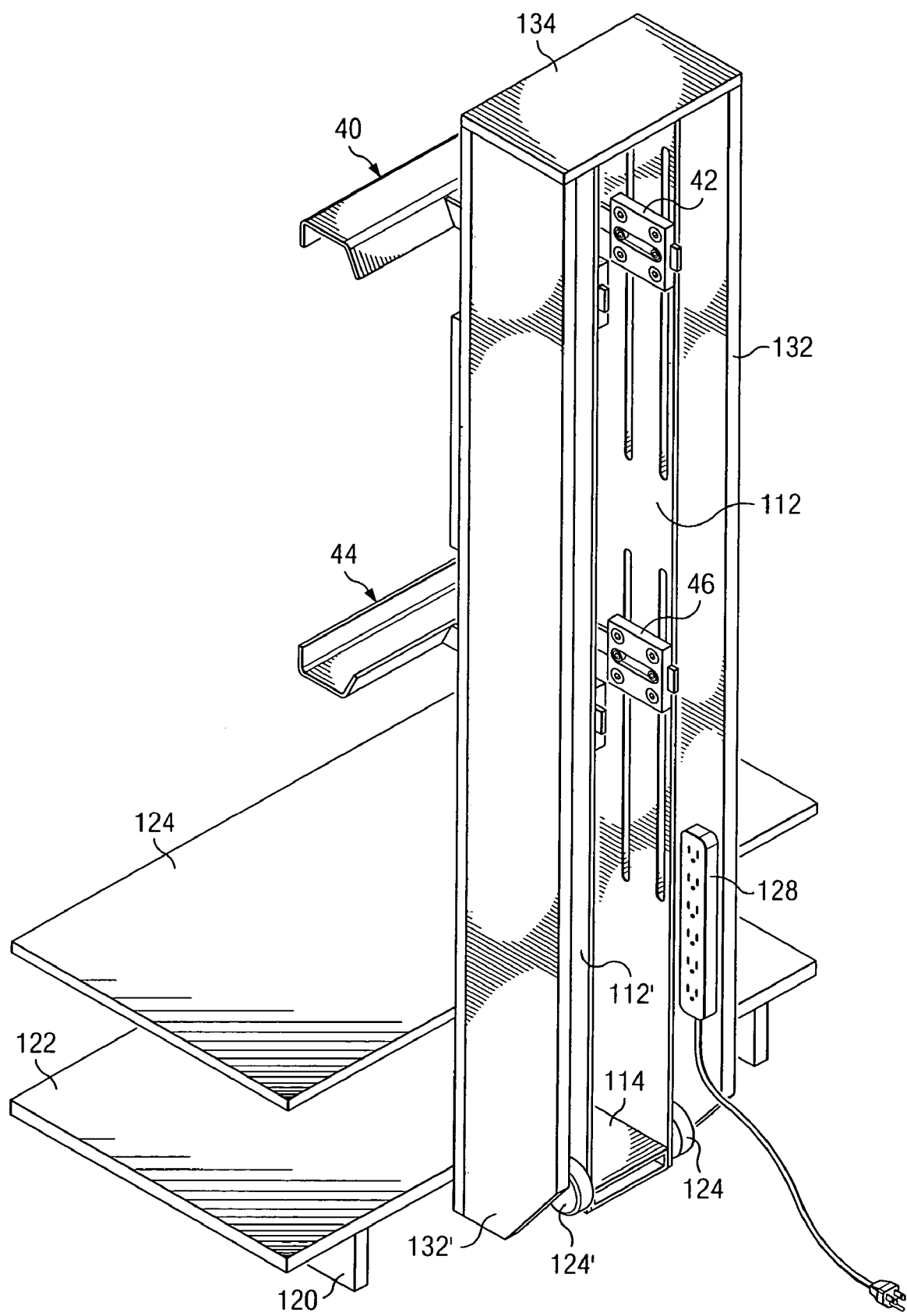
FIG. 7 is a back perspective view of the adjustable television stand of FIG. 6.

A support panel 120 is disposed around the horizontal support member 114 and the horizontal crosspiece 116, which effectively hides these structures from frontal view (as viewed in FIG. 6). A shelf 122 is disposed across the panel 120 to provide a storage area for the stand 110. An additional shelf 124, vertically spaced from the shelf 122, is also provided and is supported on the stand 110 in any conventional manner. Referring specifically to FIG. 7, the stand 110 includes a pair of wheels 124, 124' and a handle (not shown), which aid in movement of the stand. An electrical connection or power strip 128 is provided to facilitate the provision of power to the television and/or other electrical components that may be associated with the stand 110.

Referring again to FIGS. 6 and 7, a pair of sidewalls 132, 132' are disposed adjacent to the vertical supports 112, 112', respectively, for concealing a portion of the vertical supports from frontal view (as viewed in FIG. 6), and a top plate 134 is connected between the vertical supports in any conventional manner. Additionally, a vertically-extending panel 136 is disposed between the vertical supports 112, 112' in any conventional manner.

Figure 8:
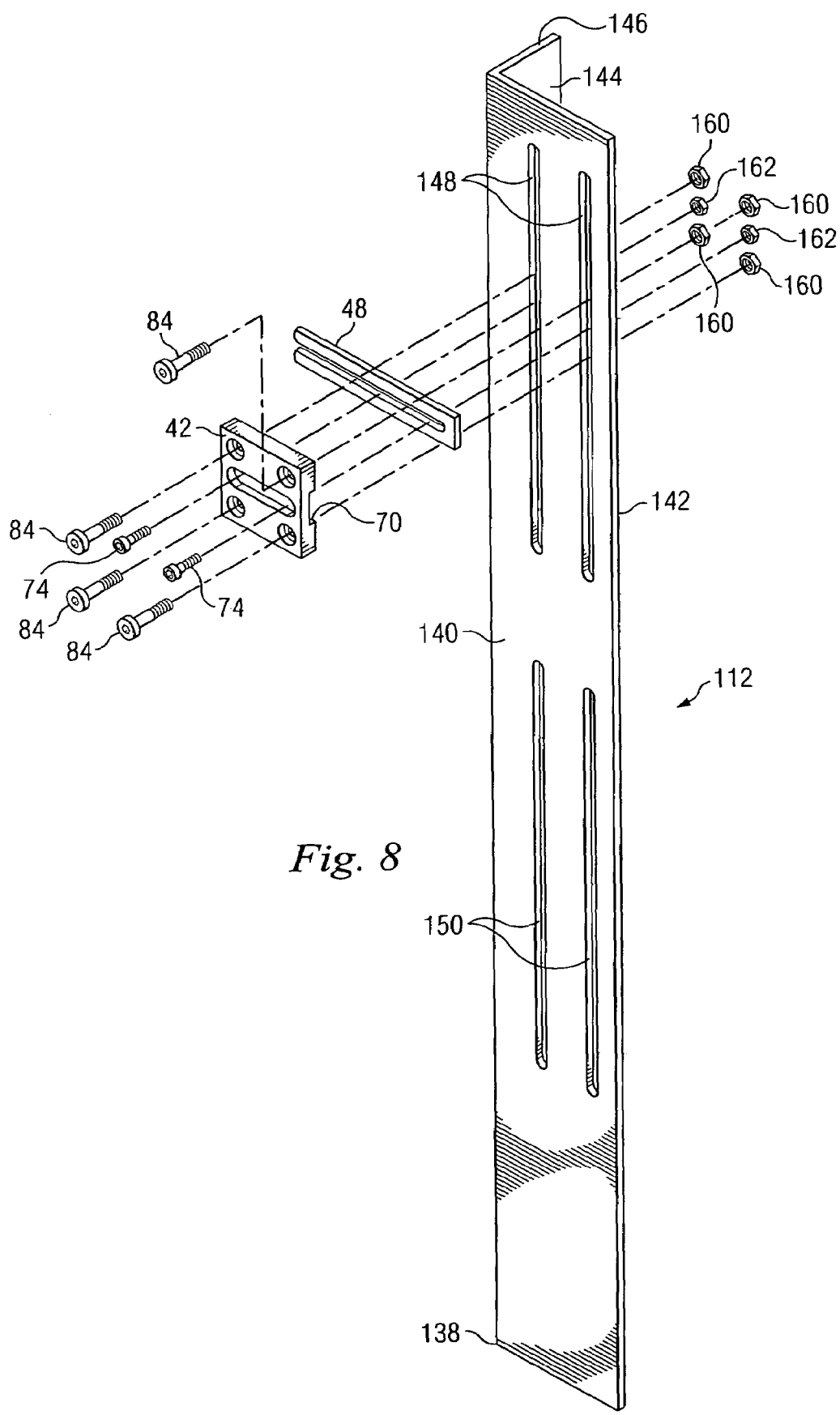
FIG. 8 is an exploded view of a portion of the adjustable television stand of FIG. 6.

Because of the similarity between the vertical supports 112, 112', only the vertical support 112 is described. Referring to FIG. 8, the vertical support 112 includes a single member with an angle or "bend" 138 that is approximately ninety degrees. The bend 138 results in four faces 140, 142, 144, 146. A first pair of parallel slots 148 are formed through the vertical support 112 to connect the faces 140, 142, and are located proximate to the upper end of the vertical support 112 (as viewed in FIG. 8). A second pair of parallel slots 150 are formed through the vertical support 112 to connect the faces 140, 142 and are located between the first pair of slots 148 and the lower end of the vertical support. Both pairs of slots 148 and 150 are parallel with the length of the vertical support 112.

The face 140 is oriented towards the vertical support 112 (FIG. 6) and perpendicular to the front of the stand 110 (as viewed in FIG. 6), with the slots 148 and 150 being defined in a plane that is parallel to a plane in which corresponding slots are defined in the vertical support 112'. The face 146 is oriented towards the front of the stand 110. Accordingly, the slots 148, 150 cooperate with the adjustable brackets 42, 46 and the slots associated with vertical support 112' cooperate with the adjustable brackets 42', 46' to allow for vertical adjustment of the clamp members 40, 44 along the vertical supports 112, 112'.

For sake of clarity, only one adjustable bracket 42 and its interaction with the vertical support 112 will be described. The adjustable bracket 42 can be pressed against the face 140 of the vertical support 112 such that the groove 70 defined in the adjustable bracket is perpendicular to the slots 148. The connectors 84 can then be inserted through the adjustable bracket to secure the adjustable bracket to the vertical support 112 via a corresponding plurality of nuts 160. Moreover, the flange portion 48 (a portion of which is shown in FIG. 8) of the clamp member 40 can be inserted into the groove 70 of the adjustable bracket 42 and the clamp member 40 can be vertically adjusted by movement of the adjustable bracket along the slots 148.

The clamp member 40 can also be horizontally adjusted via the connectors 74 and a corresponding pair of nuts 162. Specifically, the connectors 74 extend through the adjustable bracket 42 to engage the flange portion 48, and are secured to the vertical support 112 via the corresponding nuts 162. It is understood that the additional adjustable brackets 46 and 42', 46' interact with the vertical supports 112, 112' in substantially the same manner, and as such, the clamp members 40 and 44 associated with the stand 110 cooperate to hold televisions having different sizes and shapes.

It is understood that several modifications can be made to the above-described adjustable television stands 10, 110 without departing from the teachings of the disclosure. For example, the shelves associated with the stands 10, 110 may be shaped and/or supported in a variety of ways, or they may be omitted entirely. Moreover, the stands 10, 110 may be supported on a surface in a variety of ways other than angled supports 18, 20 and perpendicular supports 114, 116, respectively.

Additionally, although described for use with televisions, the stands 10, 110 may be used with other electronic devices, or in some instances, non-electronic devices. Also, although the stands 10, 110 have been described as including a pair of supports 12, 12' and 112, 112', respectively, the supports may be a single, unitary structure, or in other embodiments, the supports may include a plurality of modular components.

Furthermore, the holding portions 52, 54 are not limited to the shape as described. For example, the rear restraint 64 may be perpendicular to the upper restraint 62, or the holding portions may be configured in other manners to accommodate televisions having different shapes and sizes.

Still further, although the adjustable brackets 42, 42', 46, 46' have been described as accommodating six connectors, it is understood that the brackets may be adapted to accommodate any number of connectors. Moreover, a single adjustable bracket may be used to vertically adjust the clamp member 40, and similarly, a single adjustable bracket may be used to vertically adjust the clamp member 44. In such an embodiment, the clamp members 40, 44 each include only one flange portion. Additionally, although not depicted, the clamp members 40, 44 may be side clamp members rather than upper and lower clamp members, and therefore, one clamp member may be adjustable along one support, or a first side of a support, and the other clamp member may be adjustable along the other support, or the other side of a support.

With respect to the stand 110, the support panel 120 and the sidewalls 132, 132' may have alternative configurations, or they may be omitted entirely.

Moreover, in other embodiments, various types of connectors may be used and components may align with and connect to other components in different manners. It is also understood that all spatial references, such as "horizontal, "vertical, "top," "upper," "lower," "bottom," "left," and "right," are for illustrative purposes only and can be varied within the scope of the disclosure. While the preceding description shows and describes one or more embodiments, it will be understood by those skilled in the art that various changes in form and detail may be made therein without departing from the spirit and scope of the present disclosure. Additionally, in the claims, means-plus-function clauses are intended to cover the structures described herein as performing the recited function and not only structural equivalents, but also equivalent structures.

What is claimed is:

1. An adjustable stand, comprising:
   a support;
   a pair of upper brackets engaged with and adjustable along the support;
   a pair of lower brackets engaged with and adjustable along the support;
   an upper clamp member connected to and adjustable relative to the upper brackets; and
   a lower clamp member operatively connected to and adjustable relative to the lower brackets; wherein:
   one of the upper and lower clamp members comprises a pair of flange portions each disposed between the support and one of the upper and lower brackets via a grooved portion of the one of the upper and lower brackets; and
   the upper and lower clamp members are configured to cooperate to position an apparatus relative to the support.

2. The adjustable stand of claim 1 wherein the upper clamp member comprises the pair of flange portions, and each of the flange portions is disposed between the support and one of the upper brackets.

3. The adjustable stand of claim 1 wherein the lower clamp member comprises the pair of flange portions, and each of the flange portions is disposed between the support and one of the lower brackets.

4. The adjustable stand of claim 1 wherein:
   each of the pair of upper brackets is adjustable in a first plane;
   each of the pair of lower brackets is adjustable in the first plane; and the upper and lower clamp members are each adjustable in a second plane that is substantially perpendicular to the first plane.

5. The adjustable stand of claim 1 wherein the support comprises first and second supports each having a pair of channels defined in a side thereof, wherein the sides of the first and second supports having the channels are substantially opposed to one another.

6. The adjustable stand of claim 5 further comprising a plurality of receiver members each slidably disposed within one of the channels.

7. The adjustable stand of claim 6 wherein:
a first one of the upper brackets engages the first support adjacent a first one of the plurality of receiver members; and
a second one of the upper brackets engages the second support adjacent a second one of the plurality of receiver members.

8. The adjustable stand of claim 6 wherein:
a first one of the lower brackets engages the first support adjacent a first one of the plurality of receiver members; and
a second one of the lower brackets engages the second support adjacent a second one of the plurality of receiver members.

9. The adjustable stand of claim 5 further comprising a panel disposed between the first and second supports, the panel having at least one stop member disposed thereon.

10. The adjustable stand of claim 1 wherein the apparatus is a television.

11. An adjustable stand, comprising:
a support comprising first and second L-shaped supports;
at least one upper bracket engaged with and adjustable along the support;
at least one lower bracket engaged with and adjustable along the support;
an upper clamp member operatively connected to the at least one upper bracket; and
a lower clamp member operatively connected to the at least one lower bracket, wherein:
the upper and lower clamp members are adjustable relative to the corresponding at least one upper and lower brackets;
the upper and lower clamp members cooperate to hold an apparatus therebetween;
the first L-shaped support has a first face lying in a first plane;
the second L-shaped support has a second face lying in a second plane;
the first and second planes are substantially parallel;
the first face includes a pair of upper slots formed therethrough and a pair of lower slots formed therethrough;
the second face includes a pair of upper slots formed therethrough and a pair of lower slots formed therethrough;
the upper slots of the second face correspond to the upper slots of the first face; and
the lower slots of the second face correspond to the lower slots of the first face.

12. The adjustable stand of claim 11 wherein:
the at least one upper bracket includes a pair of upper brackets;
a first one of the upper brackets engages the first L-shaped support adjacent the upper slots of the first L-shaped support; and
a second one of the upper brackets engages the second L-shaped support adjacent the upper slots of the second L-shaped support.

13. The adjustable stand of claim 12 wherein:
the at least one lower bracket includes a pair of lower brackets;
a first one of the lower brackets engages the first L-shaped support adjacent the lower slots of the first L-shaped support; and
a second one of the lower brackets engages the second L-shaped support adjacent the lower slots of the second L-shaped support.

14. The adjustable stand of claim 13 further comprising a plurality of connectors and a corresponding plurality of nuts for releasably securing each of the upper and lower brackets with a corresponding one of the first and second L-shaped supports.

15. The adjustable stand of claim 11 further comprising a first stop member disposed on the first L-shaped support and a second stop member disposed on the second L-shaped support.

16. An adjustable television stand, comprising:
first and second clamp assemblies configured to cooperate to position a television relative to a support, the first and second clamp assemblies each including:
a pair of brackets each including an elongated opening and slidably engaged with the support via a first connector extending through the elongated opening; and
a member slidably engaged with each of the brackets and configured to interface the television;
wherein the brackets are each adjustable in a first plane and the member is adjustable in a second plane that is substantially perpendicular to the first plane, and wherein the brackets each include a plurality of apertures each configured to receive one of a plurality of second connectors.

17. The adjustable television stand of claim 16 wherein:
the elongated opening is a first elongated opening;
the member includes a holding portion and a pair of flange portions; and
the flange portions each have a second elongated opening configured to receive the first connector.

18. The adjustable television stand of claim 17 wherein the brackets each include a grooved portion configured to slidably receive one of the flange portions.

19. The adjustable television stand of claim 17 wherein the holding portion includes:
a first restraint;
a second restraint extending substantially perpendicular from the first restraint; and
a third restraint extending obliquely from the second restraint.

20. The adjustable television stand of claim 16 wherein the support includes first and second supports each having a pair of channels extending along a length thereof.

21. The adjustable television stand of claim 20 further comprising a plurality of receiver members each slidably disposed in one of the channels.

22. The adjustable television stand of claim 21 wherein:
each of the plurality of receiver members has a first threaded aperture configured to receive the first connector; and
each of the plurality of receiver members has a second threaded aperture configured to receive one of the plurality of second connectors.

23. An adjustable stand, comprising:
a support;
a pair of upper brackets engaged with and adjustable along the support;
a pair of lower brackets engaged with and adjustable along the support;
an upper clamp member connected to and adjustable relative to the upper brackets; and
a lower clamp member operatively connected to and adjustable relative to the lower brackets; wherein:
the upper clamp member comprises first and second flange portions;
the first flange portion is disposed between the support and a first one of the upper brackets via a grooved portion of the first upper bracket;
the second flange portion is disposed between the support and a second one of the upper brackets via a grooved portion of the second upper bracket;
the lower clamp member comprises third and fourth flange portions;
the third flange portion is disposed between the support and a first one of the lower brackets via a grooved portion of the first lower bracket;
the fourth flange portion is disposed between the support and a second one of the lower brackets via a grooved portion of the second lower bracket; and
the upper and lower clamp members are configured to cooperate to position an apparatus relative to the support.

24. An adjustable television stand, comprising:
first and second clamp assemblies configured to cooperate to position a television relative to first and second supports, wherein the first and second supports each have a pair of channels extending along a length thereof, and wherein the first and second clamp assemblies each include:
a pair of brackets each including an elongated opening and slidably engaged with a corresponding one of the first and second supports via a connector extending through the elongated opening; and
a member slidably engaged with each of the brackets and configured to interface the television;
wherein the brackets are each adjustable in a first plane and the member is adjustable in a second plane that is substantially perpendicular to the first plane.

25. The adjustable television stand of claim 24 wherein the connector is a first connector and the brackets each include a plurality of apertures each configured to receive one of a plurality of second connectors.

26. The adjustable television stand of claim 24 wherein:
the elongated opening is a first elongated opening;
the member includes a holding portion and a pair of flange portions; and
the flange portions each have a second elongated opening configured to receive the connector.

27. The adjustable television stand of claim 26 wherein the brackets each include a grooved portion configured to slidably receive one of the flange portions.

28. The adjustable television stand of claim 26 wherein the holding portion includes:
a first restraint;
a second restraint extending substantially perpendicular from the first restraint; and
a third restraint extending obliquely from the second restraint.

29. The adjustable television stand of claim 24 further comprising a plurality of receiver members each slidably disposed in one of the channels.

30. The adjustable television stand of claim 29 wherein:
the connector is a first connector;
each of the plurality of receiver members has a first threaded aperture configured to receive the first connector; and
each of the plurality of receiver members has a second threaded aperture configured to receive a second connector.

* * * * *